(12) United States Patent
Yang

(10) Patent No.: US 10,506,439 B2
(45) Date of Patent: Dec. 10, 2019

(54) SECURE CONTROL OF PROFILE POLICY RULES

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 15/689,829

(22) Filed: Aug. 29, 2017

(65) Prior Publication Data
US 2018/0084426 A1 Mar. 22, 2018

Related U.S. Application Data

(60) Provisional application No. 62/396,035, filed on Sep. 16, 2016.

(51) Int. Cl.
H04W 12/08 (2009.01)
G06F 21/62 (2013.01)
H04L 29/06 (2006.01)
H04W 12/06 (2009.01)
H04W 12/10 (2009.01)
(Continued)

(52) U.S. Cl.
CPC ........ *H04W 12/08* (2013.01); *G06F 21/6218* (2013.01); *H04L 63/0807* (2013.01); *H04L 63/126* (2013.01); *H04L 63/20* (2013.01); *H04W 12/0023* (2019.01); *H04W 12/06* (2013.01); *H04W 12/10* (2013.01); *H04L 63/102* (2013.01); *H04W 48/02* (2013.01)

(58) Field of Classification Search
CPC ..... H04W 12/08; H04W 12/06; H04W 12/10; H04W 12/0023; H04W 48/02; G06F 21/6218; H04L 63/0807; H04L 63/20; H04L 63/126; H04L 63/102
See application file for complete search history.

(56) References Cited

U.S. PATENT DOCUMENTS

2005/0257251 A1* 11/2005 McKune ............... G06F 21/10 726/4
2005/0268115 A1* 12/2005 Barde ................... G06F 21/10 713/189

(Continued)

OTHER PUBLICATIONS

GSM Association; Official Document SGP.01—Embedded SIM Remote Provisioning Architecture, Version 1.1, Jan. 30, 2014, 85 pages.

(Continued)

*Primary Examiner* — Ayoub Alata
(74) *Attorney, Agent, or Firm* — Dickinson Wright RLLP

(57) ABSTRACT

A secure element (SE) in a device processes profile policy rule (PPR) update information received in a message. The SE uses a rule authorization table (RAT), when processing the message, to control whether a PPR ON/OFF state will be adjusted. The PPR information identifies a profile. For example, a mobile network operator (MNO) in control of the profile may specify a policy indicating that the profile is to be deleted when the profile is disabled. The SE consults the RAT to determine verification rules for the identified policy. In some embodiments, public key infrastructure techniques authenticating a signature are used to verify that the MNO has signed the message. If the signature fails the verification, no change is made to the PPR ON/OFF state.

20 Claims, 12 Drawing Sheets

(51) Int. Cl.
*H04W 12/00* (2009.01)
*H04W 48/02* (2009.01)

(56) References Cited

U.S. PATENT DOCUMENTS

| | | | |
|---|---|---|---|
| 2014/0143826 A1* | 5/2014 | Sharp | G06F 21/604 |
| | | | 726/1 |
| 2014/0248854 A1* | 9/2014 | Schell | H04L 63/062 |
| | | | 455/411 |
| 2016/0226877 A1* | 8/2016 | Haggerty | H04L 63/0853 |
| 2016/0269386 A1* | 9/2016 | Nix | H04L 9/0869 |
| 2016/0344560 A1* | 11/2016 | Caceres | H04L 9/3268 |

OTHER PUBLICATIONS

GSM Association; Official Document SGP.22—RSP Technical Specification, Version 1.0, Jun. 9, 2016, 125 pages.
GSM Association; Official Document SGP.02—Remote Provisioning Architecture for Embedded UICC Technical Specification, Version 3.1, May 27, 2016, 297 pages.

\* cited by examiner

SECURE CONTROL OF PROFILE POLICY RULES

CROSS REFERENCE TO RELATED APPLICATION

This application claims the benefit of U.S. Provisional Patent Application No. 62/396,035 entitled "SECURE CONTROL OF PROFILE POLICY RULES," filed on Sep. 16, 2016, which is hereby incorporated by reference.

FIELD

The described embodiments relate to a security enhancement for profile (electronic subscriber identity module (eSIM)) policy rule setting.

BACKGROUND

An eSIM or profile includes software and authentication functions related to a mobile network operator (MNO). The profile may be present on a secure element (SE) within a wireless device receiving services from the MNO. The MNO may have a policy of actions to be taken with regard to the profile at the time of, for example, a profile management event. An example of a profile management event is the disabling of a profile. The on/off status of policy enforcement should be under the control of the MNO.

Universal integrated circuit cards (UICCs) and embedded UICCs (eUICCs) are SEs for hosting profiles. A profile is a combination of operator data and applications provisioned on an SE in a device for the purpose of providing services by an operator, for example, an MNO. A universal subscriber identity module (USIM) is a type of profile. A profile can be identified by a unique number called an ICCID (Integrated Circuit Card Identifier). A wireless operator is a company providing wireless cellular network services. An MNO is an entity providing access capability and communication services to its subscribers through a mobile network infrastructure. A wireless device may also be referred to herein as simply a device. An end user or customer is a person using a device. An enabled profile can include files and/or applications which are selectable over an SE-device interface. To use the device, the profile is activated with the MNO. A document related to management of profiles in consumer devices is GSM Association document GSMA SGP.22: "RSP Technical Specification," Version 1.1 Jun. 9, 2016 (hereinafter "SGP.22"). Two documents related to SEs in machine-to-machine devices, including policies, are GSM Association document GSMA SGP.01: "Embedded SIM Remote Provisioning Architecture," Version 1.1 Jan. 30, 2014 (hereinafter "SGP.01") and GSM Association document GSMA SGP.02: "Remote Provisioning Architecture for Embedded UICC Technical Specification," Version 3.1 May 27, 2016 (hereinafter "SGP.02"). A device may include a rule authorization table and evaluate authorization of a requested profile policy rule state change based on comparison with an MNO identifier in the rule authorization table. This approach is subject to fraud because any party can supply a matching MNO identifier.

SUMMARY

Representative embodiments set forth herein disclose various systems and techniques for secure control of profile policy rules.

An MNO, in some instances, establishes policies to determine actions to be taken with respect to a profile in response to the occurrence of a certain event. In some instances, policies are enforced by a policy rules enforcer function performed by the operating system of the SE. A rules authorization table (RAT) may be present in the SE. An ON/OFF state of each policy, in some embodiments, is stored in the SE. A PPR may be updated by an MNO that is in control of the associated profile, or in some instances, a PPR may be updated by another party. Evaluating authorization to update the PPR is based on PKI parameters found by use of the RAT, in some embodiments.

When the SE receives PPR update information, it checks a public key infrastructure (PKI) checkpoint column in the RAT to determine whether the PKI checkpoint is defined for the particular PPR indicated by the PPR update information. The PPR update information, in some embodiments, is included in a policy rule description of a profile being downloaded to the SE. The PKI checkpoint indicates how to perform authorization checking of the PPR update message based on PKI cryptography methods. For a particular PPR in the table, the corresponding row entries refer to one or more trusted entities with respect to the particular PPR.

In some embodiments, the SE triggers a PPR update information event by establishing a transport layer security (TLS) channel with an MNO server without a corresponding profile necessarily being enabled.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
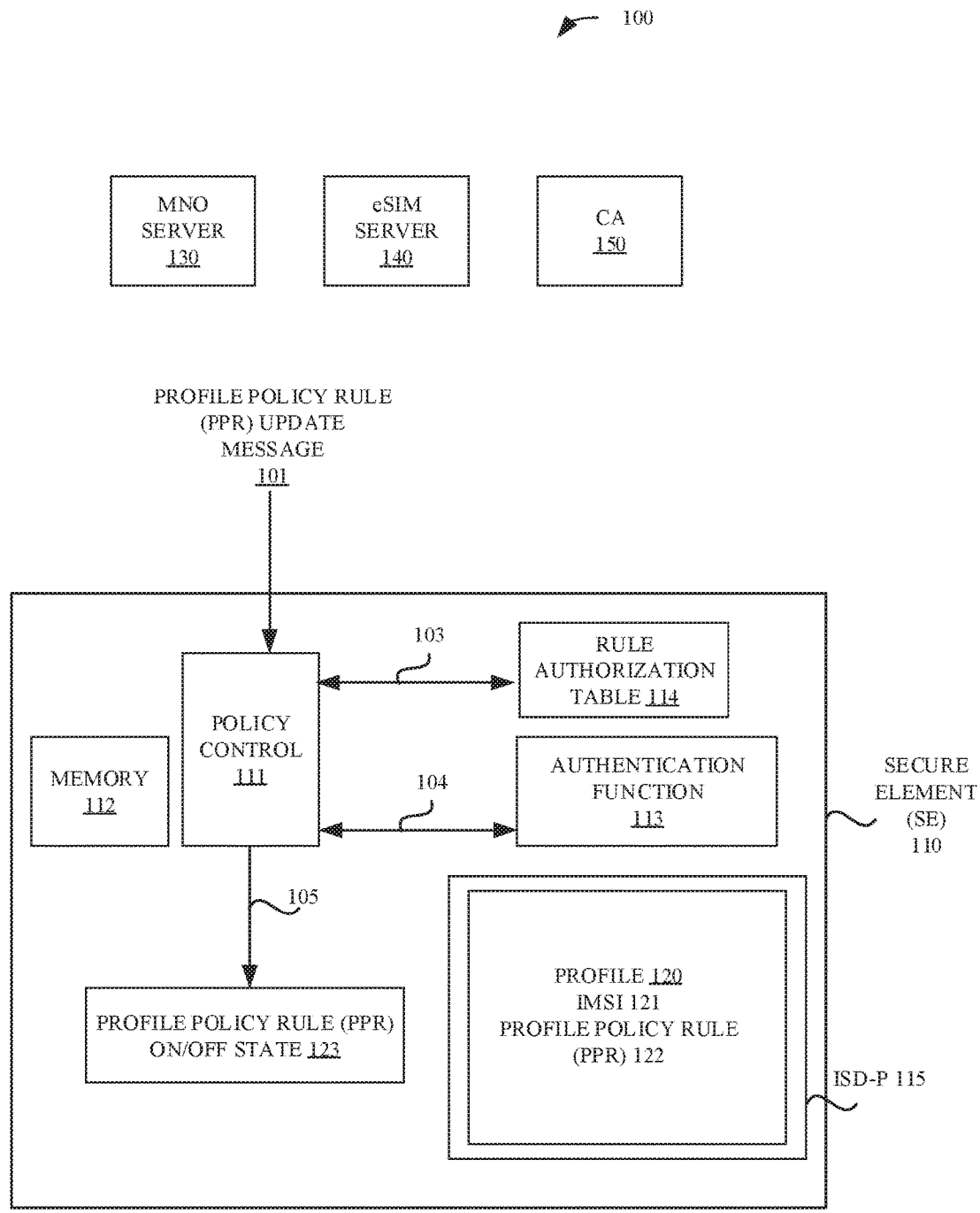
FIG. 1 illustrates an exemplary system for secure control of profile policy rules, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Profile Policies

As mentioned above, an MNO, in some instances, establishes policies to determine actions to be taken with respect to a profile in response to the occurrence of a certain event. Policy principles are reflected in a set of rules that governs the behavior of an SE (e.g., an eUICC) and/or entities involved in the remote management of the SE. A policy rule defines an atomic action of a policy and the conditions under which the action is executed. An atomic action is one which is either completed without failure or, if a failure is associated with the action, then the profile is left unchanged. Examples of polices are: i) disabling of a profile not allowed, ii) deletion of a profile is not allowed, and/or iii) profile deletion is mandatory when the profile is disabled.

A profile can be a combination of file structure, data, and applications provisioned onto, or present on, an SE such as, for example, an eUICC. The profile allows, when enabled, access by a device to a specific mobile network infrastructure. An MNO-SD entity in the profile provides, when the profile is enabled, a secure over the air (OTA) channel to the MNO associated with the profile.

The profile policy rules (PPRs) may be stored in the profile that they pertain to. The state of a given profile, enabled or disabled, is stored in a state machine in the given profile. An ISD-P is a security domain that is created to host a profile.

As mentioned above, in some instances, policies are enforced by a policy rules enforcer function performed by the operating system of the SE. A rules authorization table (RAT) may be present in the SE. The values in the RAT may be populated by the manufacturer of the SE or based on values provided by the manufacturer of the device intended to house the SE or by an MNO under a business arrangement with the manufacturer of the device. An ON/OFF state of each policy, in some embodiments, is stored in the SE. The ON/OFF state of a given policy, in some embodiments, is stored in the profile to which the given policy pertains.

A PPR may be updated by an MNO that is in control of the associated profile, or in some instances, a PPR may be updated by another party. Control of the ability to update the PPR is indicated in the RAT. Table 1 provides an exemplary RAT, according to some embodiments.

TABLE 1

Exemplary Rule Authorization Table (RAT).

| Profile Policy Rule (PPR) Identifier | MNO Name | PKI Checkpoint |
|---|---|---|
| Policy #1 | MCC1, MNC1, GID1-1, GID2-1 | Object Identifier #1 (OID1) |
| Policy #2 | MCC2, MNC2, GID1-2, GID2-2 | PKI Parameters |
| Policy #3 | MCC3, MNC3, GID1-3, GID2-3 | Not Defined |
| Policy #4 | Any | N/A |
| Policy #5 | Any | OID2 (CA OID) |
| Policy #6 | None | N/A |

When the SE receives PPR update information (referred to here as a PPR update message), it checks the PKI checkpoint column of Table 1 to determine whether the PKI checkpoint is defined for the PPR indicated by the update message. The PPR update message, in some embodiments, is included in a policy rule description of a profile being downloaded to the SE. The PKI checkpoint indicates how to perform authorization checking of the PPR update message based on PKI cryptography methods (certificate verification). For a given PPR in the table, the corresponding row entries refer to trusted entities with respect to that PPR. The profile associated with the PPR message does not need to be enabled for the MNO to update the PPR ON/OFF state. This is because the PKI checkpoint is based on PKI methods rather than based on pre-shared keys only available with an enabled profile.

The PPR update message, in some embodiments, is wrapped in a binary large object (blob) similar to an eSIM package format, for example, the metadata part (see SGP.22). In some embodiments, contents of the blob are empty except for the PPR information or message. Similar to profile provisioning, the transport channel terminates at the device and the device transmits and receives data messages to and from the SE.

In some embodiments, the SE triggers a PPR update message by establishing a transport layer security (TLS) channel with an MNO server over an ES6 interface. In this scenario, the transport terminates at the SE and the nature of the message flow is transparent to the device. The ES6 interface is explained in SGP.22, and TLS is explained in RFC 5246. In some embodiments, the SE and MNO server authenticate each other using PKI methods. TLS provides mechanisms for establishing one or more session keys for secure communication, if desired.

Referring to Table 1, policy #1 is linked to an MNO identified by a particular MCC, MNC variable pair (mobile country code, mobile network code) with values MCC1, MNC1. The MNO for policy #N is possibly further identified by GID1-N and GID2-N. GID stands for group identifier; GID1 stands for group identifier level 1. Policy #1 is also linked to an object identifier #1 referred to here as OID1. The SE can use the PKI certificate containing the value OID1 to obtain a public key, and then check the signature on the PPR update message with the public key using PKI techniques. Policy #2 is linked to an MNO public key and key parameters already loaded on the SE, indicated in table 1 as PKI parameters.

Policy #5 is linked to a particular certificate authority (CA). This provides fine granularity on the root CA of trust. For policy #5, the SE, in some embodiments, does not perform any checking on a specific controlling entity (e.g., MNO). However, it does require this entity (e.g., MNO) is associated with credentials (e.g., public key) verified by a trusted CA from a particular market. By this approach, embodiments presented herein provide a flexible policy control within markets having links with only trusted CAs, when the ecosystem of devices and servers may have multiple root CAs in various markets. For policy #3, the PKI checkpoint is not defined. The SE, in some embodiments uses the RAT of Table 1 for policy #3 by comparing MNO identifying parameters in the PPR update message with the row entries corresponding to policy #3, i.e., MMC3, MNC3 (and possibly GID1-3 and GID2-3).

Some information related to profile (eSIM) provisioning, SEs, and PKI techniques is provided here.

An SE includes an operating system, and the operating system can include ability to provide authentication algorithms to network access applications associated with a given operator. A security domain within an SE contains the operator's over the air (OTA) keys and provides a secure OTA channel. OTA keys are credentials used by an operator for remote management of operator profiles on an SE.

Public Key Infrastructure (PKI) Techniques

Communications of an SE may be authenticated using PKI techniques. Certificates used for authentication and confidentiality purposes can be generated by a CI. A public-key certificate may also be referred to herein simply as a certificate. A device, SE and/or profile may store a copy of a certificate, where the certificate holds the name of a given party (user identity). The name may be given in terms of an object identifier (OID). The public key recorded in the certificate can be used to check the signature on a message signed using a PKI private key of the given party. One example of a PKI certificate is an X.509 certificate. X.509 is described in the internet engineering task force (IETF) request for comments (RFC) 5280.

System

FIG. 1 illustrates a system 100 for secure control of profile policy rules. The system includes an SE 110, an MNO server 130, an eSIM server 140, and a certificate authority (CA) 150. The SE 110 is shown receiving a PPR update message 101 at a function denoted policy control 111. The PPR update message, in this example, is associated with the profile 120 of FIG. 1. The PPR update message 101, in some embodiments, is PPR update information in the metadata of profile 120 being downloaded from the eSIM server 140. In some embodiments, the PPR update message is associated with profile 120, and profile 120 is already present on the SE 110. FIG. 1 illustrates the profile 120 as already present on the SE 110. The profile 120 on the SE 110 is associated with a security domain ISD-P 115.

The policy control 111, in some embodiments, is a function used by the operating system (OS) of the SE 110. The policy control 111 accesses a RAT 114 (exemplified by Table 1) over an interface 103. The policy control 111 determines which row of the RAT is applicable to the PPR update message 101 and acts accordingly. In the example of FIG. 1, the PKI checkpoint of Table 1 is defined, and the policy control 111 proceeds to access the authentication function 113 over the interface 104 to verify a signature on the PPR update message 101. The authentication function 113, in some embodiments, is performed by a secure processor and secure memory of the SE 110. The signature verification, in some embodiments, depends on a PKI certificate of the MNO server 130 signed by the CA 150. If the signature verification indicates that the PPR update message is signed with a private key of the MNO associated with the profile 120 and the international mobile subscriber identity (IMSI) 121, then, via the connection 105, a PPR ON/OFF state 123 associated with a PPR 122 of the profile 120 is adjusted as needed (turned ON or OFF) according to a payload or information of the PPR update message.

An association of the profile 120 with the MNO identified in the RAT is based on the IMSI 121. An IMSI contains MNC and MCC fields corresponding to the associated operator and GID1 and GID2 fields under the control of that operator.

The PPR ON/OFF state may be stored in a file of the profile 120 or may be stored in the SE 110, for example, in the memory 112. Although the description here refers to a message and a payload, in general, the PPR update message, in some embodiments, is not a discrete message but may consist of fields or data in a blob conveyed to the SE 110, for example.

Verification Logic

Figure 2:
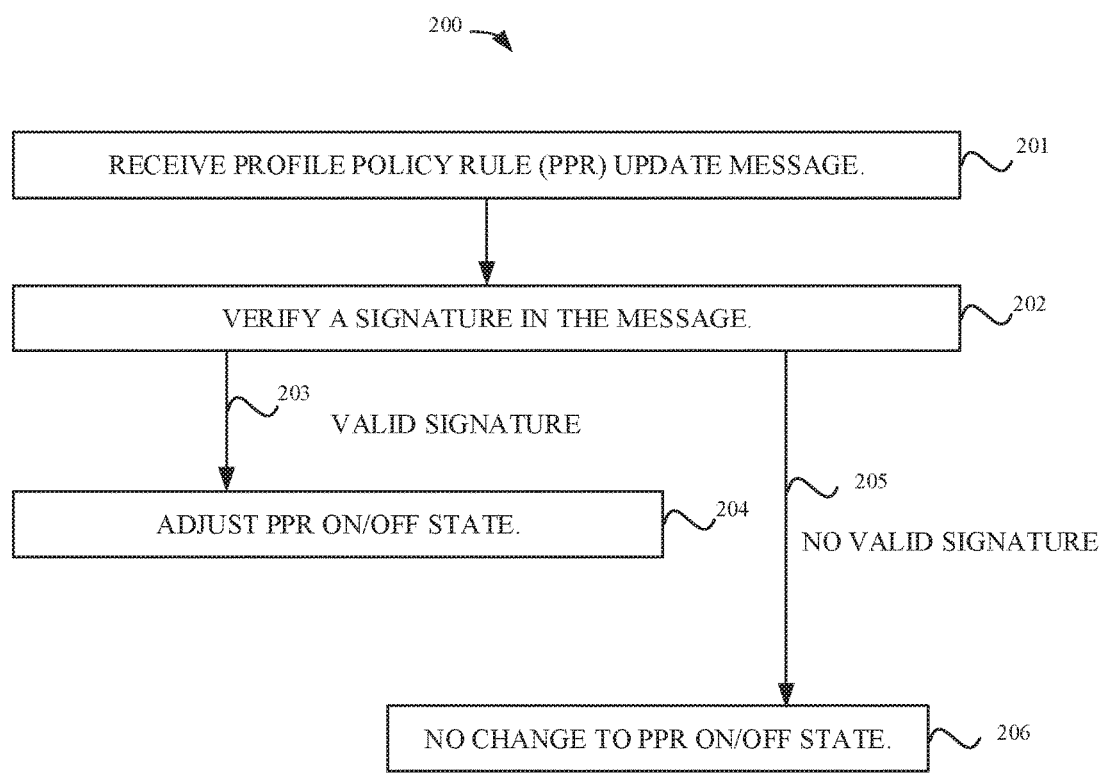
FIG. 2 illustrates exemplary logic for secure control of profile policy rules, according to some embodiments.

FIG. 2 illustrates exemplary logic 200 for secure control of profile policy rules. At 201, an SE receives a PPR update message. At 202, the SE verifies a signature in the message. If the signature is valid, the logic flows via 203 to 204 and the SE adjusts the PPR ON/OFF state to conform to the PPR update message. For example, if the PPR update message or information indicates that the policy is to be "ON", then the SE asserts a value in a memory to so indicate. At 202, if the verification fails, then the logic flows via 205 ("no valid signature") to 206 and no change is made to the PPR ON/OFF state.

For example, in some embodiments, the logic 200 is realized by the following method performed by an SE. The method includes: i) receiving a first portion of a profile, ii) parsing a first identifier of an MNO from the first portion, ii) parsing a signature from the first portion, iii) obtaining a key from an SE memory, wherein the key is associated with the MNO, and iv) verifying the signature with the key to determine a verification result. If the verification result indicates that the signature was created by the MNO, the method proceeds by identifying a policy rule of the profile, and installing the profile in the SE with the policy rule enabled. However, if the verification result indicates that the signature was not created by the MNO, the method proceeds by terminating an installation of the profile in the SE. In some embodiments of the method, the first portion of the profile is a segment of a blob. In some embodiments of the method, the terminating includes discarding the first portion of the profile.

Message Flow

Figure 3:
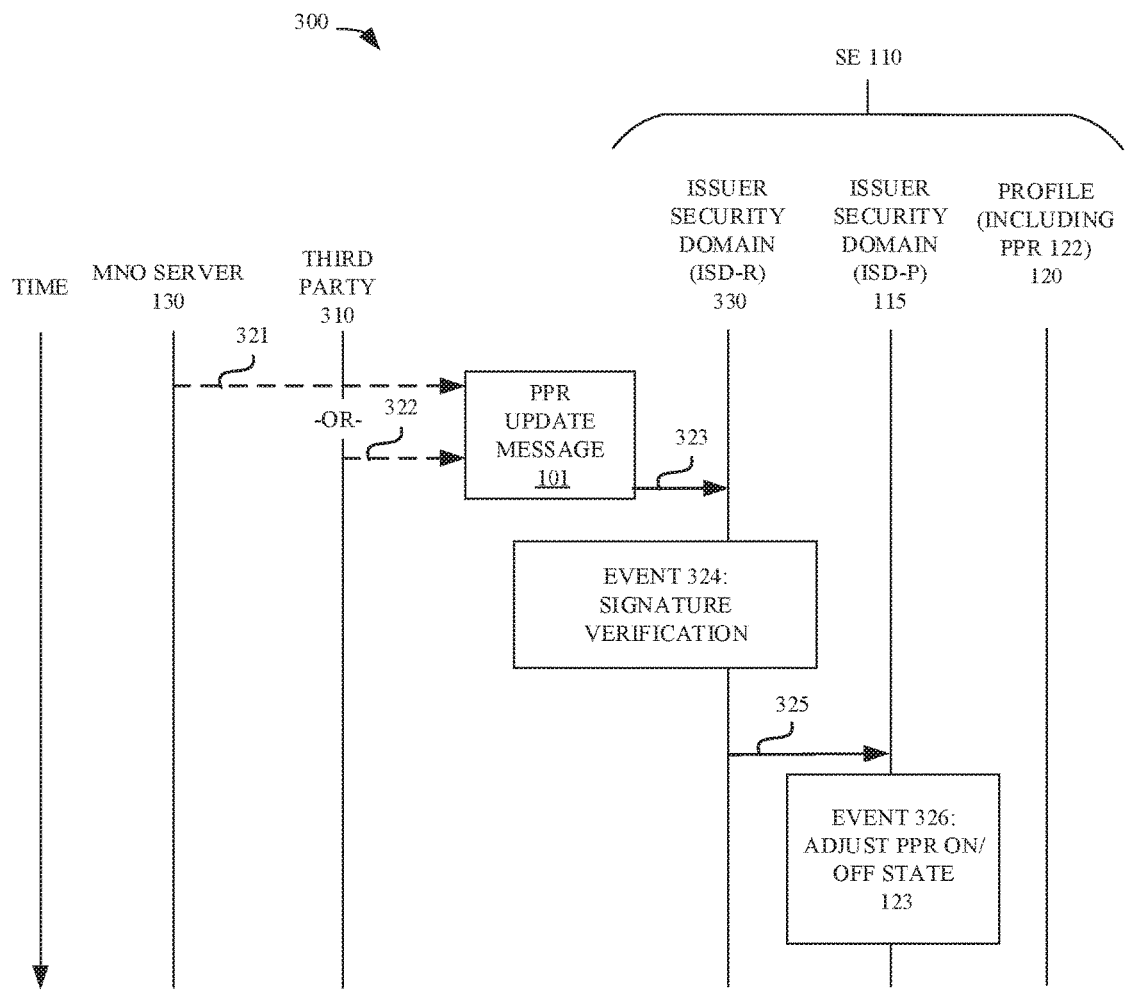
FIG. 3 illustrates an exemplary message flow including a profile policy rule (PPR) message arriving at a secure element (SE), according to some embodiments.

FIG. 3 illustrates an exemplary message flow diagram 300 for secure control of profile policy rules. Time advances from top to bottom and entities are labelled across the top from left to right. The PPR update message 101 is shown arriving (reference numeral 323) at ISD-R 330 of the SE 110. In FIG. 3, ISD-R 330 realizes the function policy control 111, as an example. The PPR update message originates, for example, from the MNO server 130 (reference numeral 321) or a third party 310 (reference numeral 322). The third party 310, in some embodiments, is the eSIM server 140. The ISD-R 330 performs signature verification as indicated by the event 324. In the example of FIG. 3, the signature verification is successful and a message 325 is sent to the ISD-P 115 to set the PPR ON/OFF state accordingly, which it does at event 326. These functions may be done by other components of the SE 110, the roles of ISD-R 330, ISD-P 115 and profile 120 are shown for illustration. For example, the profile 120 may store and update the PPR ON/OFF state upon instruction from the operating system (OS) of the SE 110 or upon instruction from the eUICC certificate authority security domain (ECASD) of the SE 110 (see FIG. 10). More details on SE, ISD-R, ISD-P and profile characteristics and relationships can be found in SGP.22.

Detailed System

Figure 4:
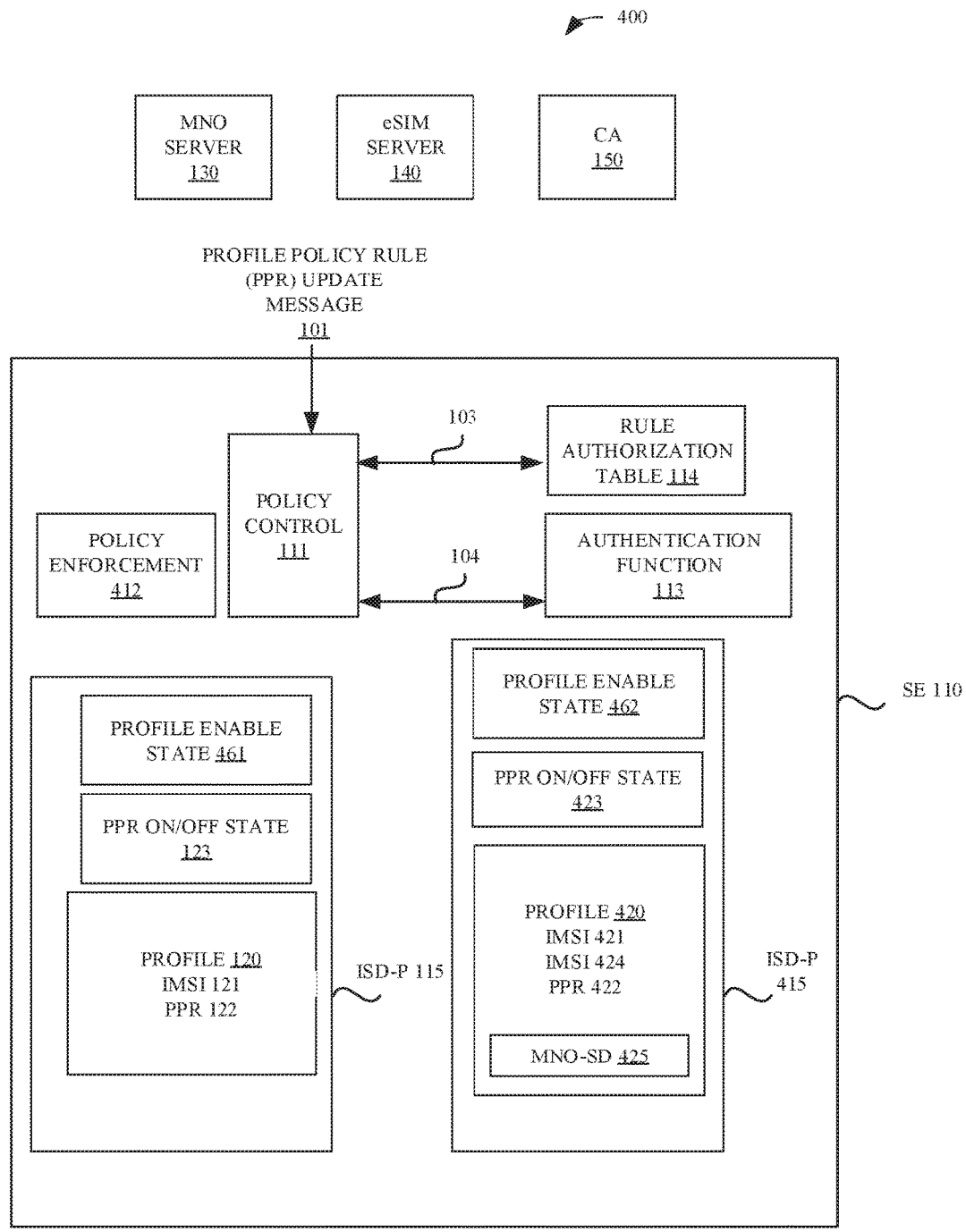
FIG. 4 illustrates an exemplary system for secure control of profile policy rules using an authentication function, according to some embodiments.

FIG. 4 illustrates a system 400 including the SE 110 with a second profile 420 in, or associated with, an ISD-P 415. FIG. 4 also illustrates state information 461 and 462 indicating whether one of profiles 120, and 420, respectively is enabled. In FIG. 4, PPR ON/OFF state 123 associated with PPR 122 is illustrated as within the ISD-P 115. Similarly state 423 of PPR 422 of the profile 420 is illustrated as within the ISD-P 415. The location of this state information is not critical. An MNO security domain, MNO-SD 425, of the profile 420 is also illustrated as well as two IMSI values: IMSI 421 and IMSI 424. The SE 110 is also illustrated with a function labelled policy enforcement 412. Policy enforcement 412 will enforce the profile policy rules 122 and 422 as needed based on certain events and based on whether the policy of interest is ON.

For example, if PPR 122 has profile enable state 461 "ON," and a proper command is received to disable profile 120, and PPR 122 indicates that the profile is to be deleted when disabled, and the PPR ON/OFF state 123 is ON, then the policy enforcement utility 412 will carry out the profile policy rule (PPR) 122 when the disable command is received by deleting profile 120.

Policy control 111, in some embodiments, first parses an MNO name from the PPR update message 101 and then checks the MNO name column of table 1 (the RAT 114) when processing the PPR update message 101. If successful in finding an MNO name match, policy control 111 then checks the PKI checkpoint column of the RAT. In some embodiments, an MNO identifier in the RAT does not match the first IMSI value checked by the policy control 111. For example, the PPR update message 101 may be associated with the profile 420. The policy control 111, in some instances, first attempts to match the MNO name of the RAT with the MNO corresponding to IMSI 421 and finds no match. As an example, consider an instance in which the IMSI 421 does not include an MNC/MCC pair matching with the RAT for this policy number. The policy control 111 then searches the profile 420 for additional IMSI values and finds the IMSI 424. For example, the IMSI 424 may indicate correspondence to the MNO name of the RAT for this profile number. After satisfying the MNO name check, the policy control 111 determines whether the PKI checkpoint is defined. If it is defined, then the policy control 111 attempts to verify, using the authentication function 113, a signature in the PPR update message or information 101, and if the verification is successful, then the policy control 111 adjusts the PPR ON/OFF state 423 as needed to conform with the instruction of the PPR update message 101. The policy control 111 is able to operate without the aid of the MNO-SD 425, because the policy control 111 is PKI-based and does not need access to pre-shared OTA keys supported by MNO-SD 425.

Receiving a Blob

Figure 5A:
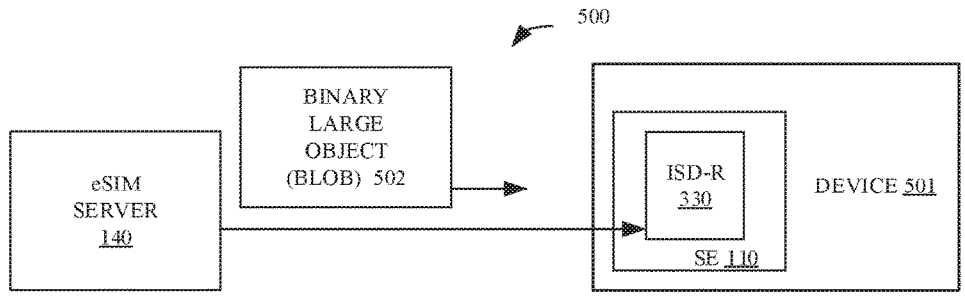
FIG. 5A illustrates an exemplary binary large object (blob) arriving at a device, according to some embodiments.

FIG. 5A provides an exemplary illustration of a system 500 including the SE 110 receiving a blob containing PPR update information. FIGS. 5B, 5C, 5D, and 5E provide exemplary blob, message, and parameter formats and contents. In FIG. 5A, the eSIM server 140 provides a blob 502 to the SE 110 within a device 501. In some embodiments, the blob 502 is provided by the MNO server 130. The blob 502 is parsed by the SE 110 and acted on by the ISD-R 330. In some embodiments, the blob 502 is acted on by the OS of the SE 110 or by another functional module of the SE 110.

Variables and Values

Figure 5B:
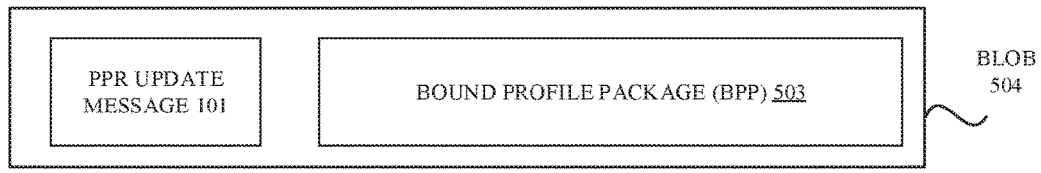
FIG. 5B illustrates an exemplary blob including a PPR update message and a bound profile package (BPP), according to some embodiments.

FIG. 5B provides a schematic representation of a blob 504 which is exemplary of the blob 502. Blob 504 includes a PPR update message 101 and a bound profile package (BPP) 503. The PPR update message 101 is representative of information instructing the SE 110 of a state that a profile policy rule of a particular profile is to be set to or conform to. The BPP may include the particular profile in an encrypted form. FIG. 5B corresponds to an embodiment in which a profile is downloaded in a BPP, and a profile policy rule ON/OFF state is indicated in information within the blob containing the BPP.

Figure 5C:
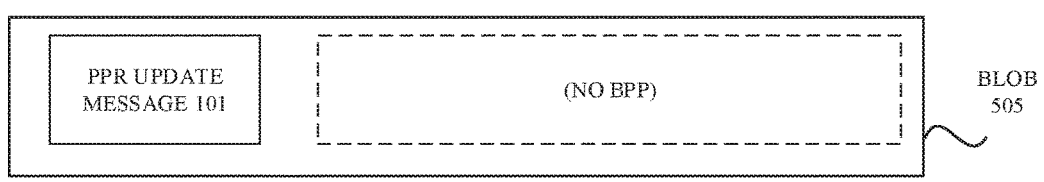
FIG. 5C illustrates an exemplary blob including a PPR update message and no BPP, according to some embodiments.

FIG. 5C, in contrast to FIG. 5B, illustrates an exemplary embodiment in which a blob 505 containing the PPR update message 101 does not contain a BPP. FIG. 5C is applicable, for example, to a situation in which the profile targeted by the PPR update message 101 is already present on the SE 110. For example, PPR message 101 of FIG. 5C, in some embodiments, is directed to PPR 122 of the profile 120 of FIG. 4. The profile enable state 461 of profile 120 may be OFF or ON. The policy control 111 will process the PPR update message 101 of FIG. 5C against the RAT 114 (also see Table 1), verify the signature (see FIG. 5D reference numeral 516), and adjust the PPR ON/OFF state 123 accordingly.

Figure 5D:
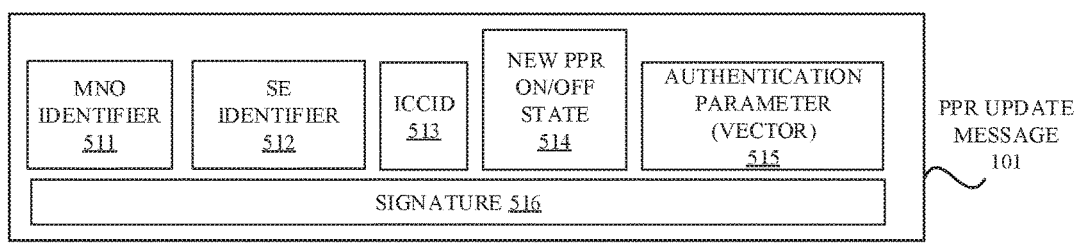
FIG. 5D illustrates an exemplary PPR update message including a signature, according to some embodiments.

FIG. 5D illustrates exemplary data fields in the PPR update message 101. The PPR update message 101 represents information, it may not be formatted as a discrete message. The PPR update message 101, in some embodiments, contains i) an MNO identifier 511, ii) an SE identifier 512, iii) a profile identifier ICCID 513, iv) a new PPR ON/OFF state 514, v) an authentication parameter (vector) 515, and/or vi) a signature 516. The dimensional descriptor "vector" makes clear that authentication parameter 515 may represent more than one variable. The fields of FIG. 5D correspond to FIG. 4, in an instance, as follows: the MNO identifier 511 is associated with the MNO server 130 and with ownership or control of the profile 120 and/or the profile 420. The MNO identifier 511 is also associated with IMSI 121, IMSI 421, and/or IMSI 424. The SE identifier 512 identifies SE 110. The ICCID 513 identifies profile 120 or profile 420. The new PPR ON/OFF state 514 represents the value, if successfully verified, that PPR ON/OFF state 123

(or PPR ON/OFF state 423) is to be set to or conform to. Authentication parameter (vector) 515 represents authentication information that is input to the policy control 111, along with information from the RAT 114, when determining if the PPR update message is from a party authorized to control the ON/OFF state of PPR 122 or PPR 422.

Figure 5E:
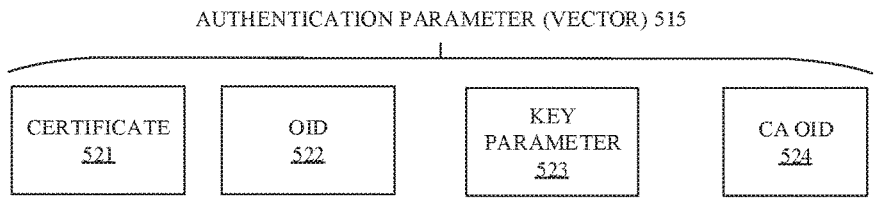
FIG. 5E illustrates exemplary authentication variables, one or more of which may be present in an authentication parameter of a PPR update message, according to some embodiments.

FIG. 5E illustrates exemplary variables present in the authentication parameter (vector) 515, in some embodiments. The authentication parameter 515, in some embodiments, includes: i) a certificate 521, ii) an identifier of a trusted entity represented as an OID 522, iii) key parameter 523, and/or iv) a certificate authority (CA) OID 524.

Logic, Profile Already Present

Figure 6:
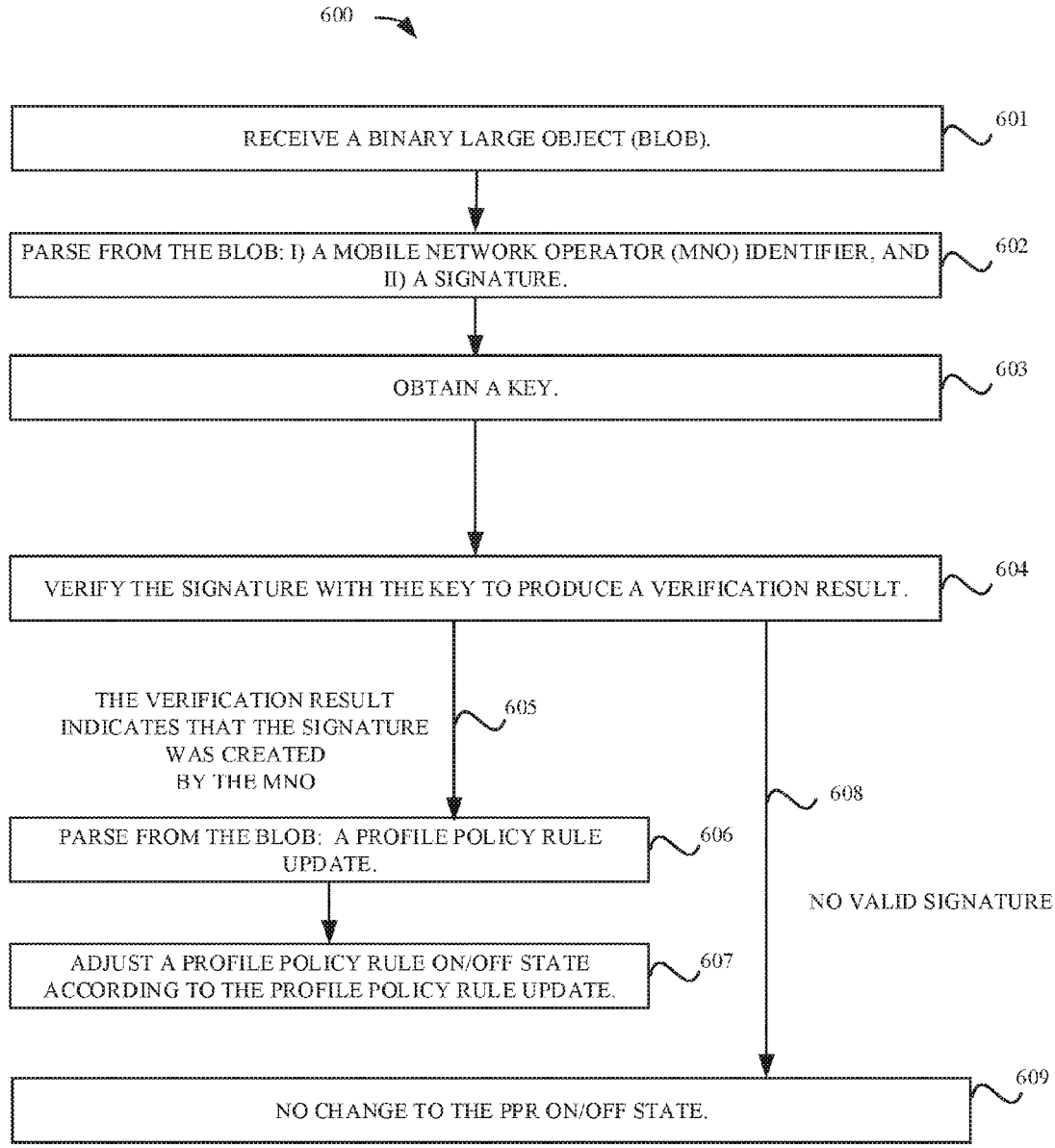
FIG. 6 illustrates exemplary logic for an SE to process a PPR update message, according to some embodiments.

FIG. 6 illustrates exemplary logic 600 for secure control of profile policy rules when the targeted profile is already present on an SE, according to some embodiments. FIGS. 3-4, FIG. 5A, and FIGS. 5C-5E provide background for the logic 600. At 601, an SE receives a blob containing a PPR update message directed to a particular profile. At 602, the SE parses from the blob an MNO identifier and a signature. At 603, the SE obtains a key, and at 604, the SE produces a verification result by providing the key and the signature as inputs to an authentication function. Obtaining the proper key for signature verification, either the preloaded CA PK, the corresponding entity PK from the certificate or the preloaded corresponding entity PK, depends on the configuration defined in Table 1. If the verification result indicates that the signature was created by the MNO authorized to control the PPR for the particular profile, the logic flows via 605 to 606. At 606, a profile policy rule update associated with a PPR is determined. At 607, the PPR ON/OFF state of the PPR is set to conform to the update. If the verification result indicates that no valid signature is present, then the logic flows from 604 along 608 to 609 and no change to a PPR ON/OFF state is performed.

Logic, Including Profile Installation

Figure 7:
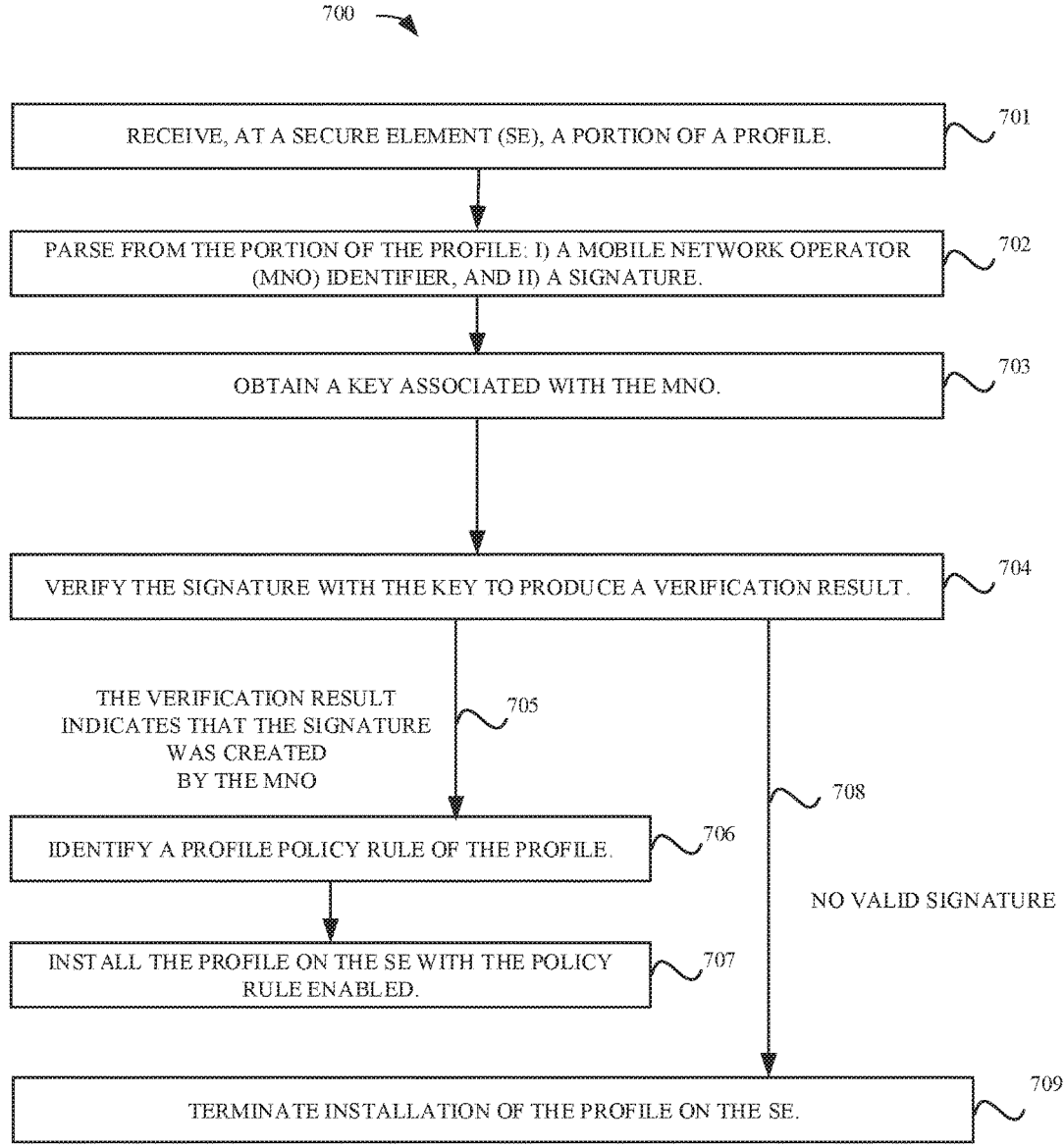
FIG. 7 illustrates exemplary logic for an SE to process a PPR update message and install a profile, in some instances, according to some embodiments.

FIG. 7 illustrates exemplary logic 700 for the secure control of a profile policy rule including the installation of a profile to which the profile policy rule pertains. The logic of FIG. 7, other than profile installation, is like the logic of FIG. 6. At 701, a portion of the profile is received by an SE. At 702, the SE parses from the profile portion an MNO identifier and a signature. At 703, the SE obtains a key associated with an MNO identified in a RAT. At 704, the SE uses the key, and the signature to produce a verification result. Obtaining the proper key for signature verification, either the preloaded CA PK, the corresponding entity PK from the certificate or the preloaded corresponding entity PK, depends on the configuration defined in Table 1. If the verification result indicates that the signature was created by the RAT-identified MNO, then the logic flows via 705 to 706. At 706, the SE identifies a PPR associated with the profile. At 707, the SE installs the profile on the SE with the policy rule, for example, enabled. If the verification result at 704 indicates no valid signature is present in the information parsed from the profile portion, then the logic flows via 708 to 709 and an installation of the profile on the SE is terminated.

PKI-Based Channel

Figures 8A, 8B:
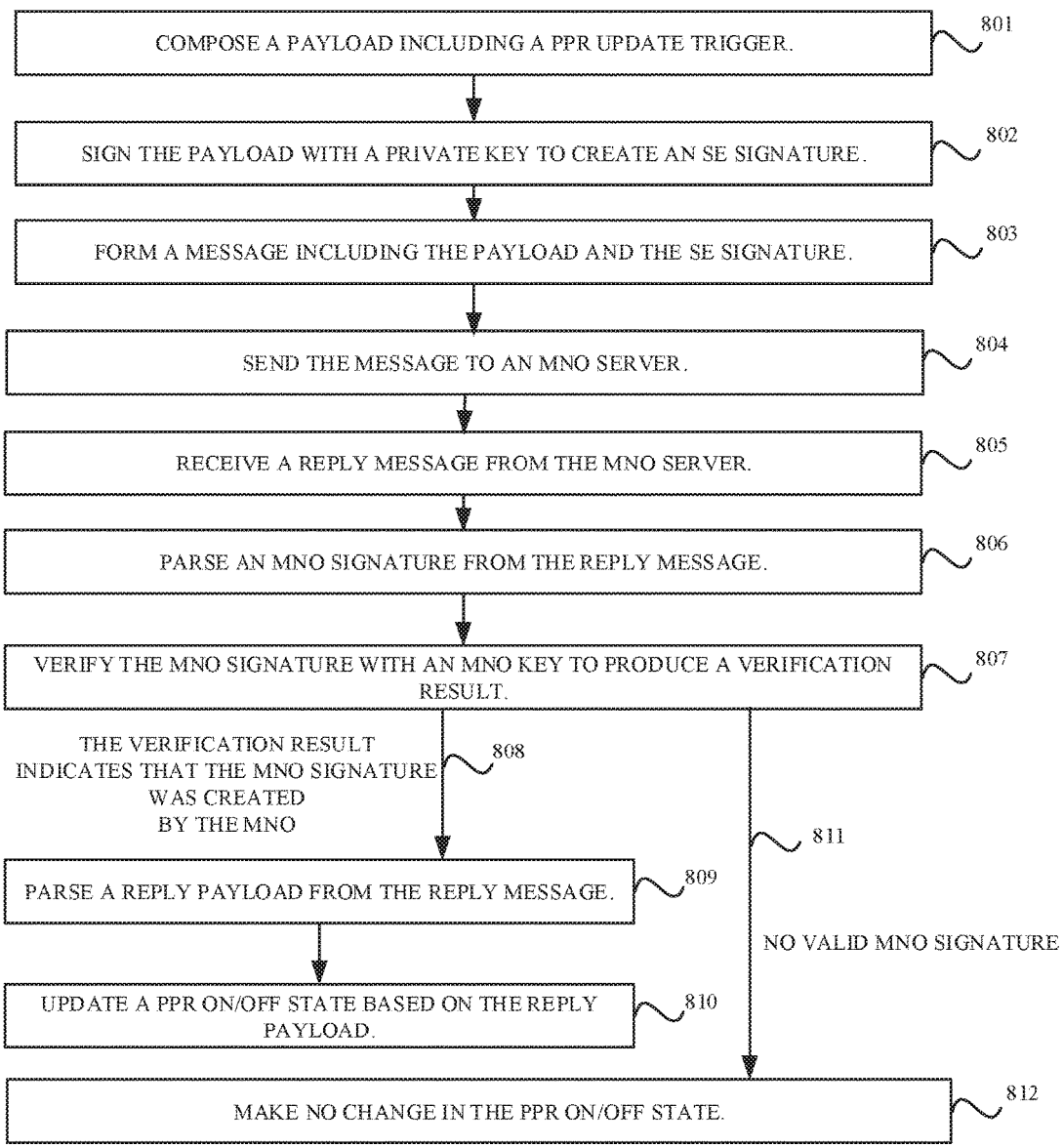
FIG. 8A illustrates an exemplary system for communication between a server and an SE using a channel set up using PKI techniques, according to some embodiments.
FIG. 8B illustrates exemplary logic used by the SE of FIG. 8A while communicating with the server of FIG. 8A in order to control a profile policy rule, according to some embodiments.

FIG. 8A illustrates an exemplary authentication and secure channel arrangement 820 that does not require an enabled profile, for example. A PKI-based channel 821 connects the MNO server 130 (or the eSIM server 140) to the SE 110. The PKI-based channel 821 is transparent to the device 501. In FIG. 8A, the PKI-based channel 821 is terminated by the ISD-R 330. Another functional entity in the SE 110, such as the OS of the SE 110, terminates the PKI-based channel 821, in some embodiments. The channel is PKI-based because it does not rely on pre-shared keys. Instead the eSIM server 140 and the SE 110 authenticate each other using PKI techniques and can set up a secure channel using, for example, TLS.

FIG. 8B illustrates exemplary logic 800 for use by the SE 110 of FIG. 8A to trigger a PPR ON/OFF state change. At 801, the SE 110, in some embodiments, composes a payload including a PPR update trigger value. At 802, the SE computes an SE signature by signing over the payload with a private key of the SE. At 803, the SE forms a message including the payload and the signature. At 804, the SE sends the message to an MNO server, for example, the MNO server 130. At 805, the SE receives a reply from the MNO server. At 806, the SE parses an MNO signature from the reply message. At 807, the SE verifies the MNO signature, for example using information from a RAT such as illustrated in Table 1, to produce a verification result. If the MNO signature is verified, the logic flows via 808 to 809. At 809, the SE parses a reply payload from the reply message, and at 810 the SE updates a PPR ON/OFF state based on the reply payload. At 811, if the MNO signature is not verified, then the logic flows via 811 to 812 and no change is made to the PPR ON/OFF state.

Logic Including More than One IMSI

Figure 9:
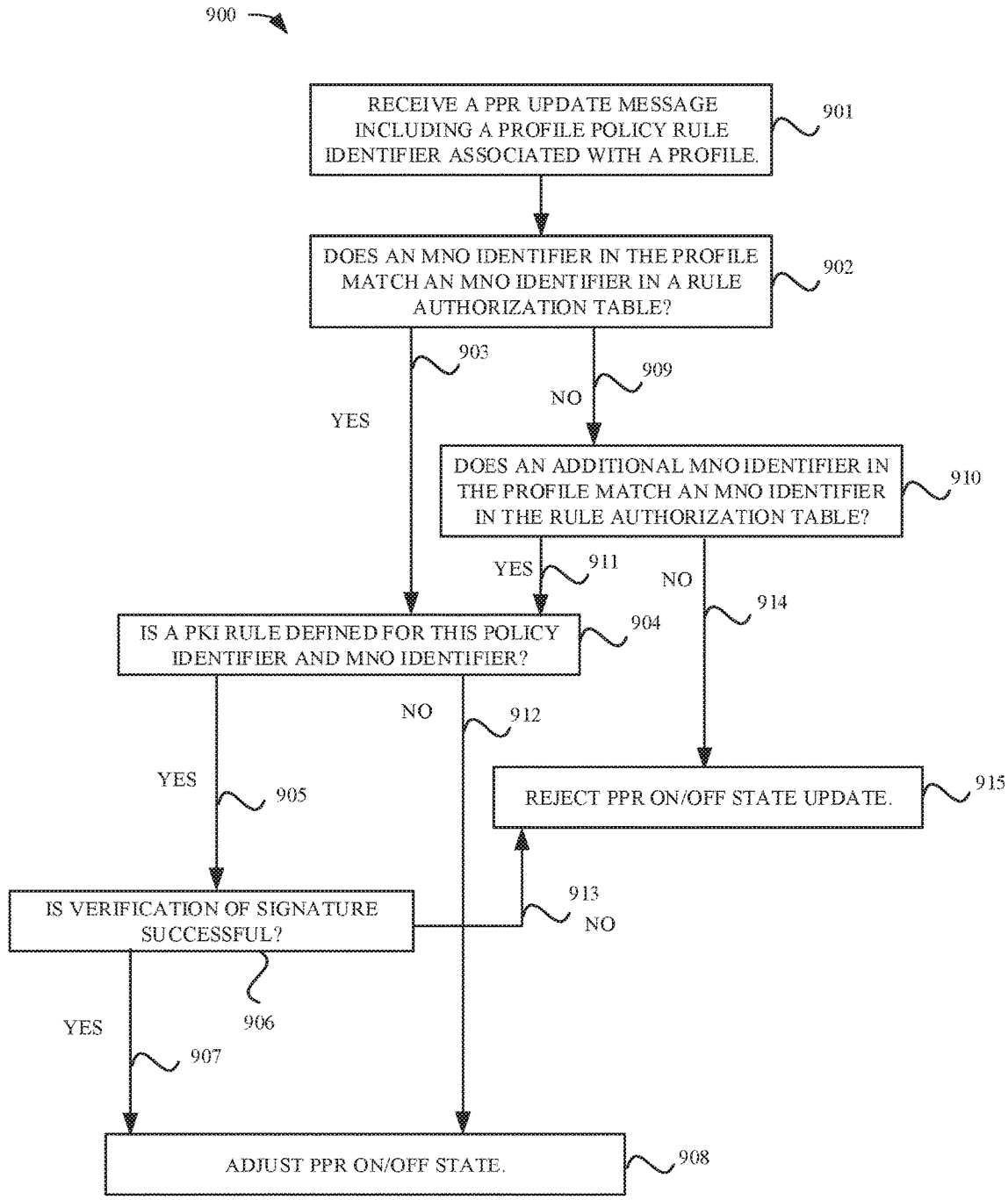
FIG. 9 illustrates exemplary logic for an SE to process a PPR update message using a rule authorization table (RAT), according to some embodiments.

FIG. 9 illustrates logic 900 for secure control of profile policy rules. Logic 900 includes verifying an MNO identifier and verifying a signature, if signature verification is defined according to a RAT. At 901, an SE receives a PPR update message targeted to a profile and including a profile policy rule identifier. The message may arrive with the profile (e.g., FIGS. 5B and 7) or the message may be directed to an already-installed profile (e.g., FIGS. 5C and 6). In FIG. 9, the example of the profile arriving with the message is discussed for illustration.

At 902, the SE determines whether an MNO identifier in the profile matches an MNO identifier in a RAT. This discussion will follow successful checks and then return to 902 in the case of no match. When an MNO identifier in the profile matches an MNO identifier in the RAT, the logic flows via 903 to 904. At 904, the SE determines whether a PKI rule is defined for this profile policy rule identifier and MNO identifier in the RAT. If yes, the logic flows via 905 to 906 and the SE performs verification of a signature parsed from the PPR update message. The verification may be done, for example, by the policy control 111 of FIG. 4 using the authentication function 113 as discussed with respect to FIG. 4 or other figures. If the verification is successful, then the logic flows via 907 to 908 and the SE adjusts the PPR ON/OFF state of the PPR in conformance with the new state as indicated by the PPR message. If the verification is not successful, the logic flows via 913 to 915 and the PPR state update attempt is rejected.

The discussion now returns to 902. If the MNO identifier evaluated in the profile at 902 does not match an MNO identifier in the RAT, then the logic flows via 909 to 910 and the SE evaluates whether an additional MNO identifier in the profile, for example, a second IMSI in a USIM, matches an MNO identifier in the RAT. If yes, the logic flows via 911 to 904 and proceeds as described earlier. At 904, if a PKI rule is not defined, the logic flows via 912 to 908 and the PPR ON/OFF state is adjusted based on the strength of the MNO match of 902 or 910. If the indicated state is ON, then the PPR will be enforced by, for example, policy enforcement 412 of FIG. 4 when event conditions invoke the PPR.

The discussion now returns to 910. If an additional MNO identifier does not match the RAT, then the logic flows via 914 to 915 and the SE rejects the PPR ON/OFF state update. In general, a profile may be installed, in some embodiments, during the process of logic 900. If a profile is installed and the logic commencing at 901 terminates at 915, then the PPR will be associated with an OFF state and the PPR will not be enforced for the profile (unless a subsequent PPR update message arrives and is verified successfully).

For example, in some embodiments, the logic 900 is realized by the following method performed by an eUICC housed in a device. The profile is present on the eUICC and the eUICC includes a RAT. The method includes: i) receiving a message comprising a profile policy rule (PPR) update, wherein the PPR update is associated with the profile, ii) obtaining a first mobile network operator (MNO) identifier from the profile, and iii) comparing the first MNO identifier with row entries in the RAT to produce a first matching result.

When the first matching result indicates that the RAT includes the first MNO identifier, the method proceeds to determine whether an authentication step is defined for the first MNO identifier and produces a first definition result. When the first definition result indicates that an authentication step is not defined, the method proceeds to update a PPR identified by the PPR update. However, when the first definition result indicates that an authentication step is defined, the method includes i) parsing a signature from the message, and ii) verifying the signature to produce a first verification result. When the first verification result indicates that the PPR update is authentic, the method proceeds to update the PPR identified by the PPR update. However, when the first verification result indicates that the PPR update is not authentic, the method does not update the PPR identified by the PPR update.

On the other hand, when the first matching result indicates that the RAT does not include the first MNO identifier, the method proceeds by determining whether the profile includes a second MNO identifier. When the profile does not include a second MNO identifier, the method does not update the PPR identified by the PPR update. However, the method includes updating the PPR identified by the PPR update when the following conditions hold: i) the profile includes a second MNO identifier, ii) the second MNO identifier matches a row entry in the RAT, iii) the authentication step is defined for the second MNO identifier, and iv) the signature from the message was created by a second MNO identified by the second MNO identifier. In some embodiments, the first MNO identifier is associated with a first IMSI found in the profile. In some embodiments, the second MNO identifier is associated with a second IMSI found in the profile.

SE Details

Figure 10:
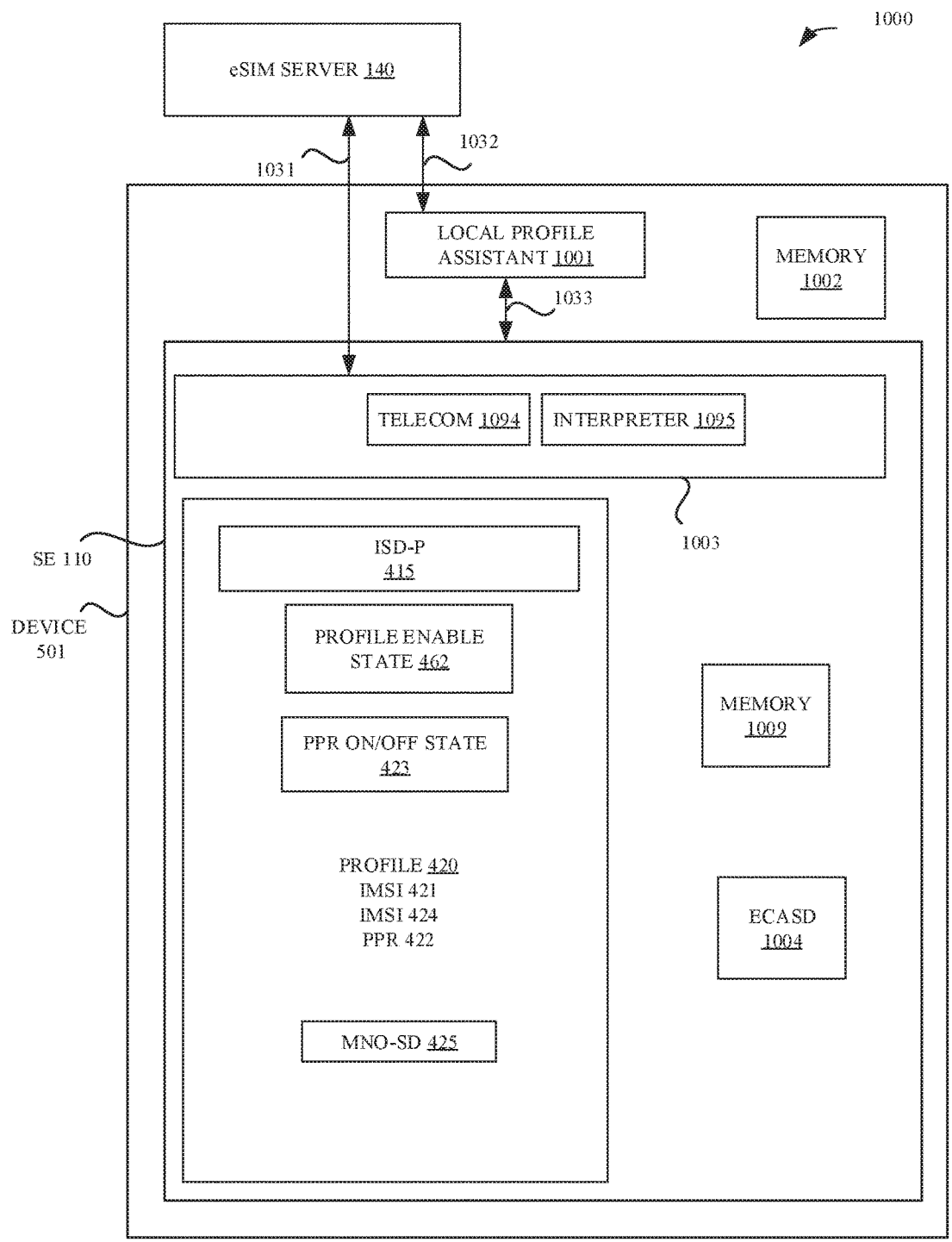
FIG. 10 illustrates an exemplary profile present on a SE in a device in communication with an eSIM server, according to some embodiments.

FIG. 10 illustrates further details of the SE 110 housed in the device 501 in a system 1000. The device includes the LPA 1001 (which may be realized in software) and the memory 1002. The SE 110 includes an operating system 1003. Within the operating system 1003 is a telecom framework 1094 which provides authentication algorithms to network access applications (NAAs). Interpreter 1095 translates profile package data into an installed profile using a specific internal format of the SE 110. ISD-P 415 hosts the profile 420. An event processed by the device 501 with the SE 110 can include, for example, installing, enabling, or disabling of the profile 420.

The ISD-P is a secure container (security domain) for the hosting of the profile 420. The ISD-P is used for profile download and installation in collaboration with the interpreter 1095 for the decoding of a received bound profile package. The SE 110 also includes a memory 1009 and the ECASD 1004. ECASD 1004 provides secure storage of credentials required to support the security domains on SE 110. MNO-SD 425 is the representative on the SE 110 of an operator providing services to an end user. The MNO-SD 425 contains the operator's OTA keys and provides a secure OTA channel.

The eSIM server 140 communicates with the SE 110, in some embodiments, on interface 1031. The eSIM server 140 may also communicate via the local profile assistant 1001 using the interfaces 1032 and 1033. The MNO server 130 also communicates directly with the SE or indirectly through the device 501 (these interfaces are not shown in FIG. 10).

Example Device Connections

Figure 11:
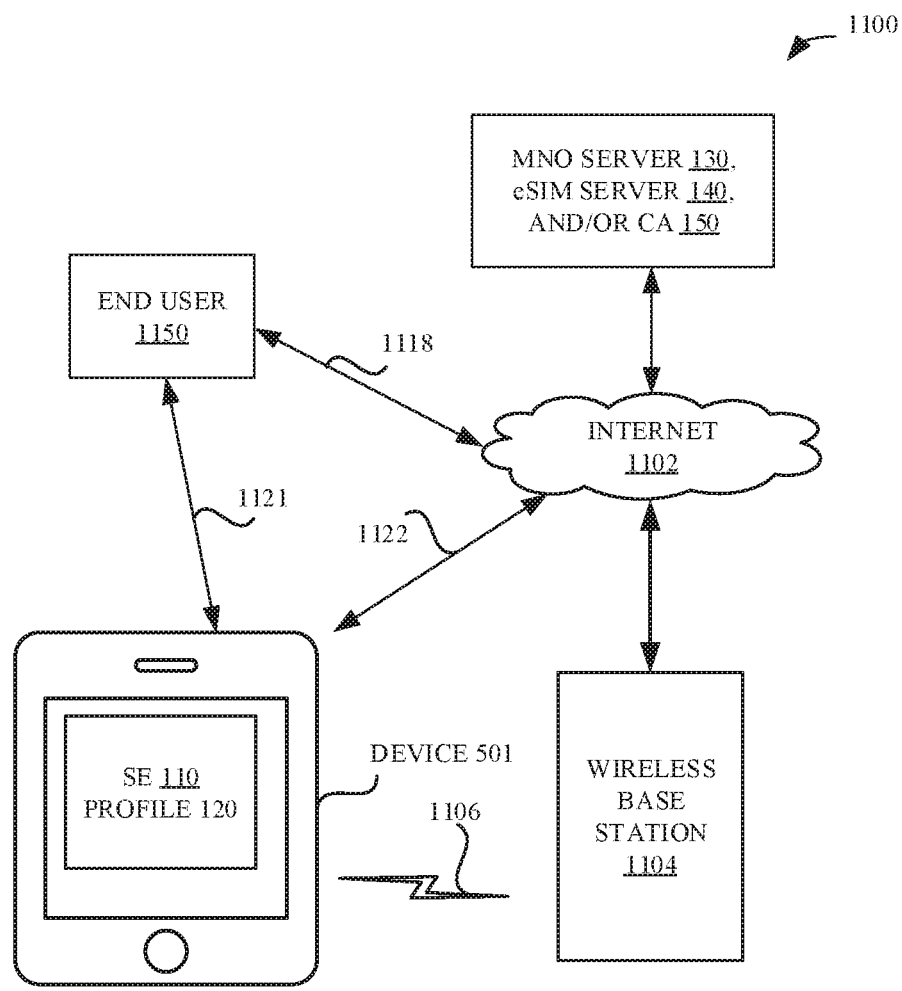
FIG. 11 illustrates exemplary connection methods of various entities described in this application, according to some embodiments.

FIG. 11 illustrates example connection methods for secure control of profile policy rules in a system 1100. End user 1150 can manage device 501 using interface 1121 which can support user interface inputs. The end user 1150 can also remotely manage device 501 via the Internet 1102 using interface 1118. The device 501 is shown connected to a wireless base station 1104 by a wireless link 1106 or to the Internet 1102 via a wired connection 1122. The wireless base station 1104 can be an Institute of Electronic and Electrical Engineers 802.11 Wireless Fidelity (IEEE 802.11 Wi-Fi) access point (AP) or the wireless base station 1104 can be, for example, a cellular mobile network base station. Examples of cellular mobile network base stations are a 2G or 3G base station or an LTE eNode B.

Wireless devices, and mobile devices in particular, can incorporate multiple different radio access technologies to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion, or primary, wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) radio access technologies. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 12:
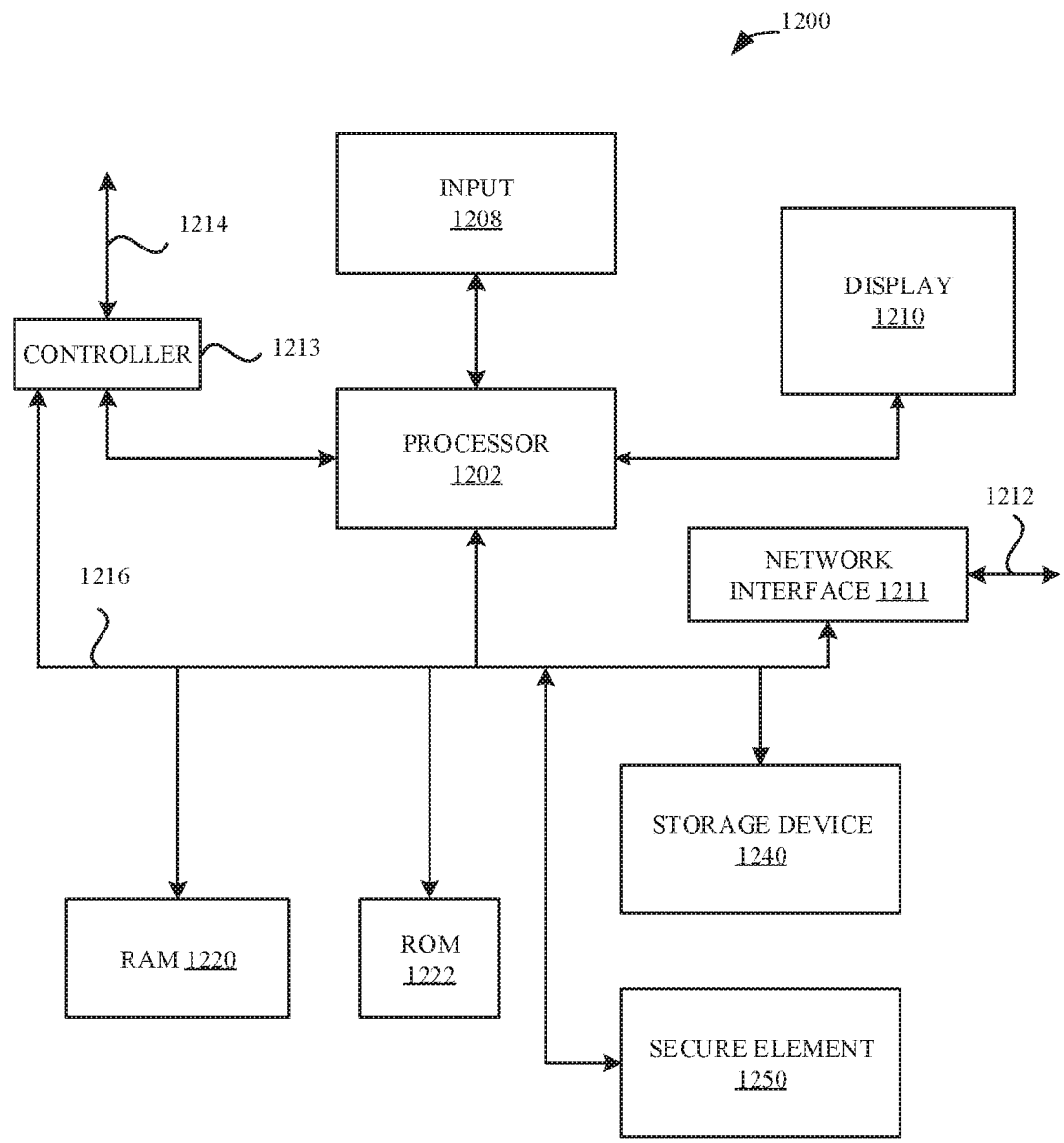
FIG. 12 illustrates an exemplary apparatus for implementation of the embodiments disclosed herein, according to some embodiments.

FIG. 12 illustrates in block diagram format an exemplary computing device 1200 that can be used to implement the various components and techniques described herein, according to some embodiments. In particular, the detailed view of the exemplary computing device 1200 illustrates various components that can be included in the device 501, the SE 110, the eSIM server 140 and/or the MNO server 130 illustrated in FIGS. 1, 4, 5A, 8A and 11. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, information relating to incoming, outgoing, or active communication session). A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that couples to a data link 1212. In the case of a wireless connection, the network/bus interface 1211 can include wireless circuitry, such as a wireless transceiver and/or baseband processor. The computing device 1200 can also include a secure element 1250. The secure element 1250 can include an eUICC or a UICC. In some embodiments, the computing device 1200 includes a baseband processor, one or more radio frequency (RF) transceivers and one or more antennas (not shown).

The computing device 1200 also includes a storage device 1240, which can comprise a single storage or a plurality of storages (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory ("RAM") 1220 and a Read-Only Memory ("ROM") 1222. The ROM 1222 can store programs, utilities or processes to be executed in a non-volatile manner. The RAM 1220 can provide volatile data storage, and stores instructions related to the operation of the computing device 1200.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method by a secure element (SE), the method comprising:
   i) receiving a binary large object (blob);
   ii) parsing a first identifier of a mobile network operator (MNO) from the blob;
   iii) parsing a signature from the blob;
   iv) obtaining a key;
   v) when a verification of the signature with the key indicates that the signature was created by the MNO:
      a) parsing profile policy rule (PPR) update information from the blob, and
      b) setting a policy rule variable to an enabled state or disabled state based on the PPR update information, wherein the policy rule variable is associated with a profile present on the SE; and
   vi) when the verification of the signature with the key indicates that the signature was not created by the MNO:
      making no change in the policy rule variable.

2. The method of claim 1, further comprising:
   when the verification of the signature with the key indicates that the signature was not created by the MNO:
      discarding the blob.

3. The method of claim 1, wherein an international mobile subscriber identity (IMSI) associated with the profile is associated with the MNO.

4. The method of claim 1, wherein: i) the blob was received from an electronic subscriber identity module (eSIM) server via a device, and ii) the SE is housed in the device.

5. The method of claim 1, wherein the parsing a profile identifier comprises parsing the profile identifier from a metadata portion of the blob.

6. The method of claim 1, wherein: i) the blob does not comprise a bound profile package (BPP), and ii) the profile present on the SE is in a disabled state.

7. The method of claim 1, wherein the obtaining a key comprises:
   obtaining public key parameters from the blob, wherein the public key parameters are associated with the MNO.

8. The method of claim 1, wherein the obtaining a key comprises:
   obtaining the key from an SE memory location.

9. The method of claim 8, wherein the obtaining a key comprises:
   parsing an object identifier (OID) from the blob;
   addressing an SE memory location based on the OID; and
   obtaining the key from the SE memory location.

10. The method of claim 9, wherein the OID is associated with a certificate authority (CA).

11. The method of claim 9, wherein the OID is associated with the MNO.

12. The method of claim 1, wherein the obtaining a key comprises:
   obtaining the key from a certificate, wherein: i) the blob comprises the certificate and ii) the certificate comprises an identifier of the MNO.

13. The method of claim 12, wherein: i) the certificate is signed by a certificate issuer (CI), and ii) a trusted list stored in the SE comprises an identifier of the CI.

14. A secure element (SE) comprising:
   a memory; and
   a processor, wherein the memory includes instructions that when executed by the processor cause the SE to perform operations comprising:
      i) receiving a binary large object (blob),
      ii) parsing a first identifier of a mobile network operator (MNO) from the blob,
      iii) parsing a signature from the blob,
      iv) obtaining a key,
      v) when a verification of the signature with the key indicates that the signature was created by the MNO:
         a) parsing profile policy rule (PPR) update information from the blob, and
         b) setting a policy rule variable to an enabled state or disabled state based on the PPR update information, wherein the policy rule variable is associated with a profile present on the SE, and
      vi) when the verification of the signature with the key indicates that the signature was not created by the MNO:
         making no change in the policy rule variable.

15. The SE of claim 14, wherein the parsing a profile identifier comprises parsing the profile identifier from a metadata portion of the blob.

16. The SE of claim 14, wherein the blob does not comprise a bound profile package (BPP).

17. The SE of claim 14, wherein the obtaining a key comprises:
   obtaining the key from a certificate, wherein: i) the blob comprises the certificate and ii) the certificate comprises an identifier of the MNO.

18. The SE of claim 14, wherein the obtaining a key comprises:
   parsing an object identifier (OD) from the blob;
   addressing an SE memory location based on the OID; and
   obtaining the key from an SE memory location.

19. The SE of claim 18, wherein the OID is associated with the MNO.

20. A non-transitory computer readable medium including instructions that when executed by a secure element (SE) cause the SE to perform operations comprising:
   i) composing a payload, wherein the payload comprises a profile policy rule (PPR) update trigger value;
   ii) signing the payload with private key of the SE to produce a first signature;
   iii) forming a first message, wherein the first message comprises the payload and the first signature;
   iv) sending the first message, via a device housing the SE, to a mobile network operator (MNO) server;
   v) receiving a second message, via the device, from the MNO server;
   vi) parsing a second signature from the second message;
   vii) when a verification of the second signature indicates that the second signature was created by the MNO:
      a) parsing a second payload from the second message, and
      b) updating a PPR, wherein the updating is based on the second payload; and
   viii) when the verification of the second signature indicates that the second signature was not created by the MNO:
      making no change in the PPR.

* * * * *